(12) United States Patent
Boninfante

(10) Patent No.: US 10,385,929 B2
(45) Date of Patent: Aug. 20, 2019

(54) VEHICLE INPUT SHAFTS

(71) Applicant: Boninfante Friction, Inc., Yeadon, PA (US)

(72) Inventor: Rob Boninfante, West Chester, PA (US)

(73) Assignee: Boninfante Friction, Inc., Yeadon, PA (US)

( * ) Notice: Subject to any disclaimer, the term of this patent is extended or adjusted under 35 U.S.C. 154(b) by 37 days.

(21) Appl. No.: 15/400,751

(22) Filed: Jan. 6, 2017

(65) Prior Publication Data

US 2017/0191532 A1    Jul. 6, 2017

Related U.S. Application Data

(60) Provisional application No. 62/275,515, filed on Jan. 6, 2016.

(51) Int. Cl.

| F16D 13/58 | (2006.01) |
| F16D 13/40 | (2006.01) |
| F16C 3/02 | (2006.01) |
| F16D 1/06 | (2006.01) |
| F16D 3/06 | (2006.01) |
| F16D 13/38 | (2006.01) |
| F16D 13/50 | (2006.01) |
| F16D 1/10 | (2006.01) |

(52) U.S. Cl.
CPC ............. *F16D 13/58* (2013.01); *F16C 3/02* (2013.01); *F16D 3/06* (2013.01); *F16D 13/385* (2013.01); *F16D 13/50* (2013.01); *F16C 2226/80* (2013.01); *F16C 2240/50* (2013.01); *F16C 2361/43* (2013.01); *F16C 2361/55* (2013.01); *F16D 2001/103* (2013.01)

(58) Field of Classification Search
CPC .................................................. Y10T 403/7035
See application file for complete search history.

(56) References Cited

U.S. PATENT DOCUMENTS

| 1,725,774 | A | * | 8/1929 | Zeithammer | F16H 1/2854 |
| | | | | | 475/336 |
| 3,256,967 | A | * | 6/1966 | Roland | F16D 1/072 |
| | | | | | 192/107 R |
| 5,007,517 | A | * | 4/1991 | Flotow | F16F 15/129 |
| | | | | | 192/110 R |
| 6,371,396 | B1 | * | 4/2002 | Kawasaki | A01K 89/01557 |
| | | | | | 242/289 |
| 6,675,453 | B2 | | 1/2004 | Briggs | |

(Continued)

FOREIGN PATENT DOCUMENTS

JP        58-172402        * 10/1983

*Primary Examiner* — Mark A Manley
(74) *Attorney, Agent, or Firm* — Christopher J. Owens; Leech Tishman Fuscaldo & Lampl

(57) ABSTRACT

Vehicle input shafts are disclosed. The vehicle input shafts include a bearing boss, a spline portion, a cylindrical shaft body portion and a drive end. The spline portion includes spline teeth and spline grooves that do not exit directly onto the shaft body. Instead, the spline grooves include blend out fillets that interrupt the spline grooves by providing additional material near the shaft body. The bearing boss includes an increased diameter at a central point along its axial length and decreased diameters at its first and second boss ends.

20 Claims, 4 Drawing Sheets

(56) References Cited

U.S. PATENT DOCUMENTS

| | | | |
|---|---|---|---|
| 6,877,350 B2 * | 4/2005 | Fuhrmann | B21K 1/762 |
| | | | 72/354.2 |
| 7,100,464 B2 | 9/2006 | Gardin | |
| 7,485,044 B2 | 2/2009 | Briggs | |
| 8,079,912 B2 * | 12/2011 | Matsubara | F16C 3/02 |
| | | | 403/359.6 |
| 2001/0045140 A1 | 11/2001 | Kamminga et al. | |
| 2010/0027932 A1 * | 2/2010 | Fujiwara | F16C 19/26 |
| | | | 384/548 |

* cited by examiner

VEHICLE INPUT SHAFTS

CROSS-REFERENCE TO RELATED APPLICATION

This application claims the benefit of U.S. Provisional Patent Application Ser. No. 62/275,515 filed Jan. 6, 2016, which is incorporated herein by reference.

FIELD OF THE INVENTION

The present invention relates to vehicle input shafts, and more particularly relates to vehicle input shafts having splined portions capable of withstanding high stresses.

BACKGROUND INFORMATION

Vehicle input shafts are used to transmit drive power from an engine to a drive line through a clutch assembly. The first end of the vehicle input shaft is typically received within a bearing of a flywheel attached to the crank of the engine. This arrangement stabilizes the center point of rotation of the vehicle input shaft. One or more clutch plates or discs are mounted near the first end of the vehicle input shaft for axial movement along the shaft, while preventing relative rotation between the input shaft and the clutch disc(s). The second end of the vehicle input shaft is typically drivingly connected with the drive line of the vehicle, e.g., through a transmission assembly.

Conventional vehicle input shafts include drive teeth that engage the clutch disc(s) to allow the disc(s) to move axially along the shaft while preventing relative rotational movement. The drive teeth are provided in the form of splines having grooves therebetween that exit out onto the central cylindrical portion of the shaft, creating a stress riser at the location where the splines meet the cylindrical shaft. This is characteristically the location where current input drive shafts experience failure. In addition, current input shafts have cylindrical bearing bosses with end tapers that do not allow the bosses to move freely when they flex from the extreme side loads experienced during use. These design flaws cause current input shafts to fail after a limited amount of use.

SUMMARY OF THE INVENTION

The present invention provides vehicle input shafts having a bearing boss, a spline portion, a cylindrical shaft body portion and a drive end. The spline portion includes spline teeth and spline grooves that do not exit directly onto the shaft body. Instead, the spline grooves include blend out fillets that interrupt the spline grooves by providing additional material near the shaft body. The bearing boss includes an increased diameter at a central point along its axial length and decreased diameters at its first and second boss ends.

An aspect of the present invention is to provide an input shaft for a vehicle drive line comprising a first shaft end, a spline portion having a first spline end adjacent to the first shaft end and a second spline end, the spline portion comprising multiple spline teeth extending in a direction parallel with a longitudinal axis of the input shaft and extending axially away from the longitudinal axis, and multiple radially indented spline grooves located circumferentially between adjacent ones of the spline teeth extending in a direction parallel with the longitudinal axis of the input shaft, a second shaft end, a substantially cylindrical shaft body extending from the second shaft end toward the second spline end, and a tapered transition between the second spline end and the shaft body, wherein each spline groove comprises a blend out fillet adjacent the second spline end extending radially outward from a bottom surface of the spline groove and longitudinally toward the shaft body.

Another aspect of the present invention is to provide a clutch assembly comprising a clutch plate cover structured and arranged for attachment to a flywheel of a vehicle engine, at least one clutch disc inside the clutch plate cover, an input shaft upon which the at least one clutch disc is mounted for rotation with the input shaft and sliding engagement along a longitudinal axis of the input shaft, wherein the input shaft comprises a first shaft end, a spline portion having a first spline end adjacent to the first shaft end and a second spline end, the spline portion comprising multiple spline teeth extending in a direction parallel with a longitudinal axis of the input shaft and extending radially away from the longitudinal axis, and multiple radially indented spline grooves located circumferentially between adjacent ones of the spline teeth extending in a direction parallel with the longitudinal axis of the input shaft, a second shaft end, a substantially cylindrical shaft body extending from the second shaft end toward the second spline end, and a tapered transition between the second spline end and the shaft body, wherein each spline groove comprises a blend out fillet adjacent the second spline end extending radially outward from a bottom surface of the spline groove toward the shaft body.

A further aspect of the present invention is to provide an input shaft for a vehicle drive line comprising a first shaft end, a bearing boss at the first shaft end comprising an increased diameter at a central point along its axial length, a decreased diameter at a first bearing boss end located at the first shaft end, and decreased diameter at a second bearing boss end, a spline portion having a first spline end adjacent to the second bearing boss end and a second spline end, the spline portion comprising multiple spline teeth extending in a direction parallel with a longitudinal axis of the input shaft and extending radially away from the longitudinal axis, and multiple radially indented spline grooves located circumferentially between adjacent ones of the spline teeth extending in a direction parallel with the longitudinal axis of the input shaft, a second shaft end, a substantially cylindrical shaft body extending from the second shaft end toward the second spline end, and a tapered transition between the second spline end and the shaft body.

These and other aspects of the present invention will be more apparent from the following description.

DETAILED DESCRIPTION

Figure 1:
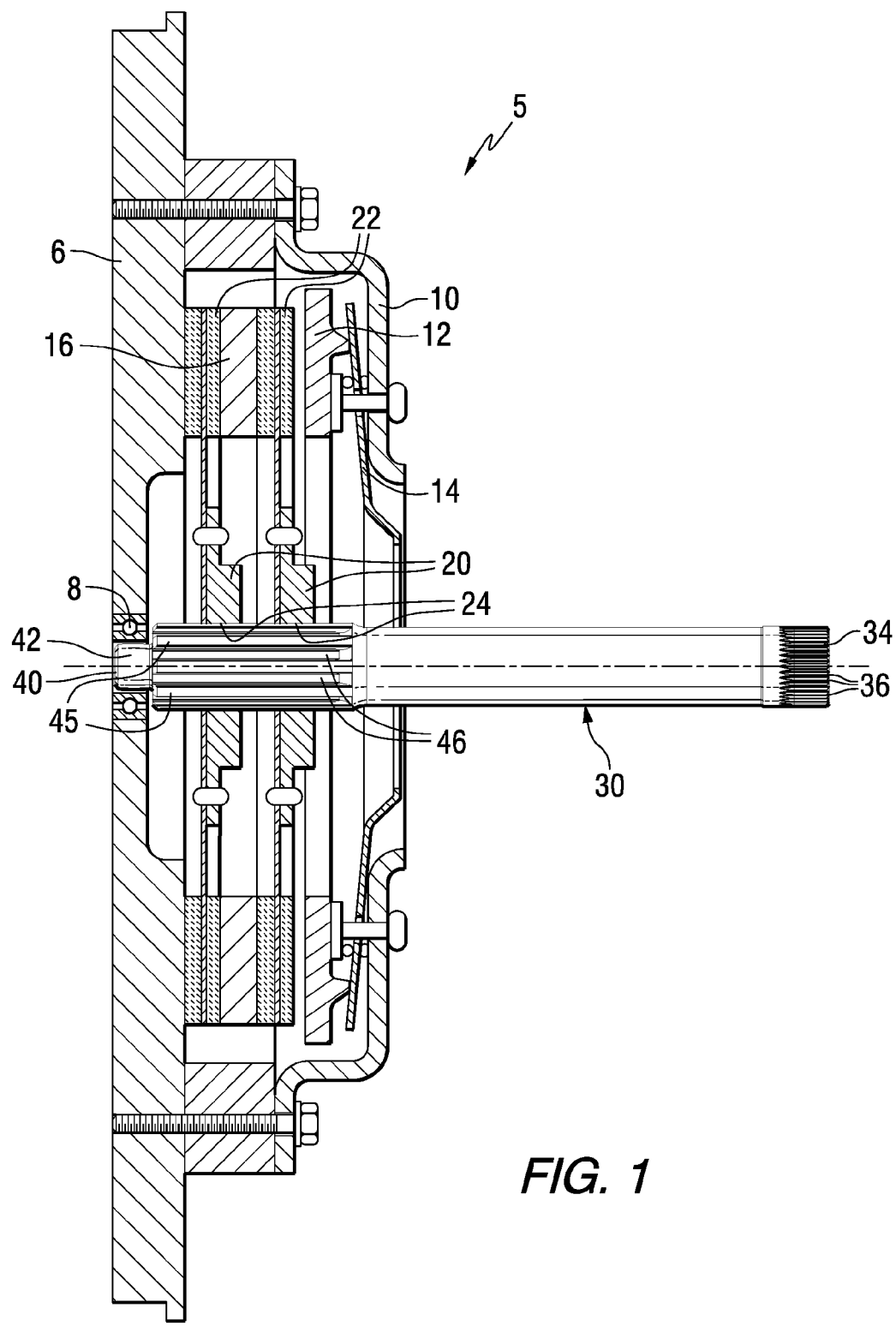
FIG. 1 is a partially schematic side view of a clutch assembly including an input shaft in accordance with an embodiment of the present invention.

FIG. 1 is a partially schematic side sectional view illustrating a clutch assembly 5 including a driven flywheel 6 having a pilot bearing assembly 8. The clutch assembly 5 further includes a clutch plate cover 10, a pressure plate 12, a disc spring 14, friction discs 16, clutch discs 20 and an input shaft 30 in accordance with an embodiment of the present invention. The input shaft 30 comprises a first shaft end 40 having a bearing boss 42 and a second shaft end 34. The bearing boss 42 includes a first boss end at the first shaft end 40 and a second boss end adjacent to the spline portion 44. In the embodiment shown, the bearing boss 42 is coupled with the pilot bearing assembly 8 of the flywheel 6, as more fully described below. The second shaft end 34 is typically adjacent to the drive line (not shown) of the vehicle. The clutch discs 20 include clutch pads 22 and a central splined opening 24 in the hub of the clutch disc 20 structured and arranged to engage the spline portion 44 of the input shaft 30.

Figure 2:
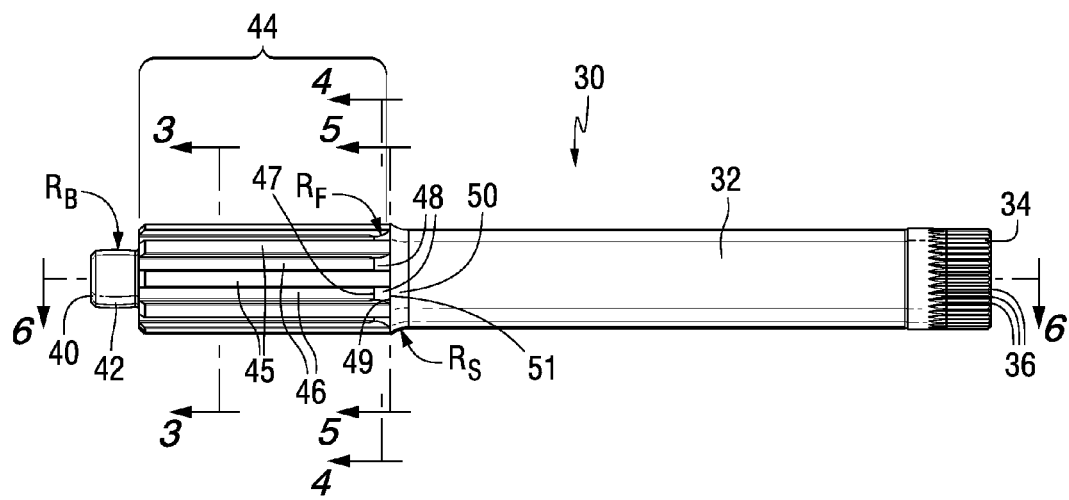
FIG. 2 is a side view of the vehicle input shaft of FIG. 1.

As shown in FIG. 2, the input shaft 30 has a substantially cylindrical shaft body 32, a first shaft end 40 and a second shaft end 34. The first shaft end 40 is typically adjacent to the flywheel 6 of the engine, as shown in FIG. 1, and the second shaft end 34 is typically adjacent to the drive line (not shown) of the vehicle. As shown in FIG. 2, the input shaft 30 comprises a spline portion 44 having a first end adjacent to the second boss end of the bearing boss 42 of the first shaft end 40 and a second end adjacent to the shaft body 32. In accordance with embodiments of the present invention, the spline portion 44 may be configured for engaging the central splined opening 24 of four to six clutch discs 20. In the embodiment shown in FIG. 1, two clutch discs 20 are supported by the spline portion 44 of the input shaft 30. However, any other suitable number of clutch discs 20 may be used. For example, one, three, four or more clutch discs may engage the spline portion 44. The clutch discs 20 are floatably engaged axially along the spline portion 44 and rotate with the input shaft 30. The second shaft end 34 of the input shaft 30 has drive line teeth 36 which are rotatably engaged with the vehicle's drive line (not shown).

In an embodiment of the present invention, the spline portion 44 comprises multiple spline teeth 45 and multiple radially indented spline grooves 46. The spline grooves 46 are located circumferentially between adjacent ones of the spline teeth 45. While ten spline teeth 45 and ten spline grooves 46 are shown in the embodiments of FIGS. 1-5, the spline portion 44 of the input shaft 30 may be equipped with any other desired number of spline teeth 45 and spline grooves 46, such as six, eight, nine, eleven, twelve or more spline teeth and spline grooves. In accordance with an embodiment of the present invention, the spline teeth 45 extend in a direction parallel with a longitudinal axis of the input shaft 30 and also extend radially away from the longitudinal axis. The spline grooves 46 extend in a direction parallel with the longitudinal axis of the input shaft 30 and also are radially indented toward the longitudinal axis. Each of the spline teeth 45 includes a radial outer surface and each spline groove 46 includes a bottom surface 47.

As shown in FIG. 2, each spline groove 46 comprises a blend out fillet 48 adjacent the second end of the spline portion 44 extending radially outward from the bottom surface 47 of the spline groove 46 toward a radially outermost edge 49 and also extending longitudinally toward the shaft body 32. In the embodiment shown, each blend out fillet 48 extends radially outwardly from the bottom surface 47 to a radially outermost edge 49. For example, the radial extension distance of the blend out fillet 48 may range from 0.01 to 0.5 inch, for example, from 0.025 to 0.25 inch or from 0.05 to 0.2 inch. In the embodiment shown, the radially outermost edge 49 may have a radial distance from the bottom surface 47 corresponding to the radial distance between the radial outer surface of the spline teeth 45 and the bottom surface 47, i.e., the radially outermost edge 49 of the blend out fillet 48 extends substantially the same radial distance as the radial outer surface of the adjacent spline teeth 45. However, in certain embodiments, the outermost edge 49 of the blend out fillet 48 may extend the full radial distance of the adjacent spline teeth 45. For example, the radially outermost edge 49 of the blend out fillet 48 may extend at least 50 percent of the radial distance between the bottom surface 47 of the spline groove 46 and the radial outer surface of the spline teeth 45, or at least 75 percent of the radial distance between the bottom surface 47 of the spline groove 46 and the radial outer surface of the spline teeth 45.

The blend out fillet 48 also extends an axial length along the spline groove 46 of the spline portion 44 toward the shaft body 32. For example, the axial length of the blend out fillet 48 may range from 0.05 to 0.75 inch, for example, from 0.1 to 0.5 inch or from 0.15 to 0.3 inch. The ratio of the axial length to the radial extension distance of each blend out fillet may typically range from 10:1 to 1:3. For example, from 5:1 to 1:2, or from 3:1 to 1:2, or from 2.5:1 to 1:1. In a particular embodiment, the ratio of the axial length to the radial extension distance may be about 2:1. The ratio of the axial length to the radial dimension may be varied depending on the necessary clearances required by the clutch assembly 5.

Figure 3:
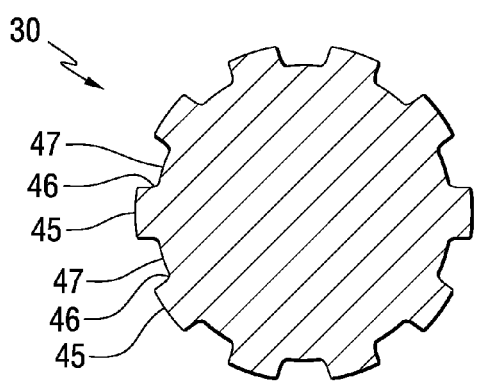
FIG. 3 is a cross-sectional view of the vehicle input shaft taken through section 3-3 in FIG. 2.
Figure 4:
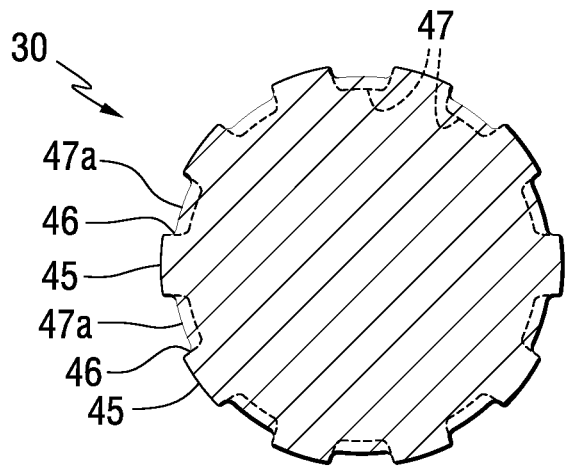
FIG. 4 is a cross-sectional view of the vehicle input shaft taken through line 4-4 in FIG. 2.
Figure 5:
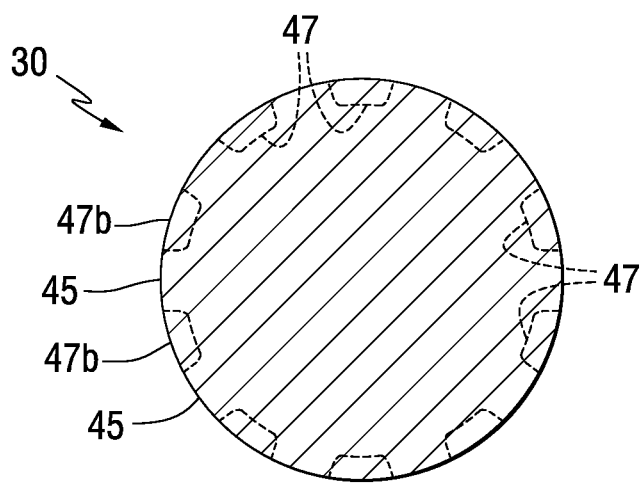
FIG. 5 is a cross-sectional view of the vehicle input shaft taken through line 5-5 in FIG. 2.

FIGS. 3, 4 and 5 are cross-sectional views illustrating varying radial depths of each spline groove 46 and blend out fillet 48 at different locations along the longitudinal axis of the spline portion 44. As shown in FIGS. 3-5, the radial depth of each spline groove 46 varies along the longitudinal length of the spline portion 44. As shown in FIG. 3, the radial depth of each spline groove is consistent from the first end of the spline portion 44 to the blend out fillet 48. As shown in FIG. 4, at a longitudinal position along the length of the spline portion 44, the blend out fillet 48 begins to build up radially outward from the bottom surface 47 of the spline groove 46. The radial extension of the blend out fillet 48 from the bottom surface 47 creates a new bottom surface 47a of the spline groove 46 having a shallower radial depth. The cross section of FIG. 5 is taken through the radially outermost edge 49 of the blend out fillet 48. In the embodiment shown, at the radially outermost edge 49, the radial extension of the blend out fillet 48 is substantially equal to the radial extension of the outer surface of the adjacent ones of the spline teeth 45. As a result, the bottom surface 47b of the spline groove 46 shown in FIG. 5 forms a rim having a diameter substantially the same as the outer diameter of the spline teeth 45, thereby forming a substantially circular cross section.

Figure 6:
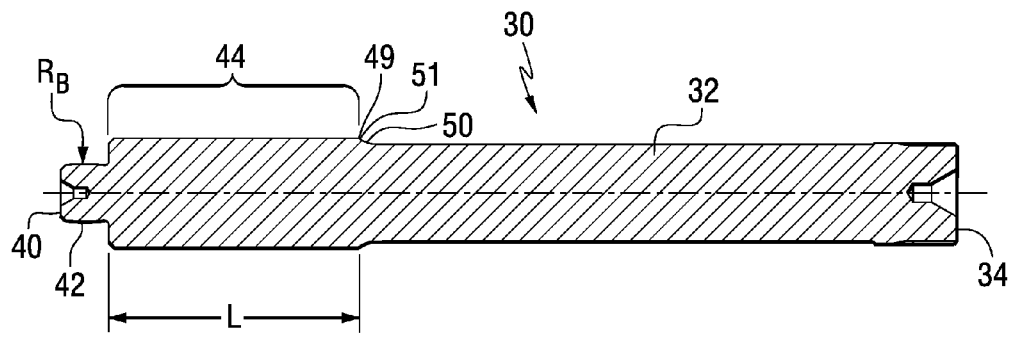
FIG. 6 is a longitudinal sectional view of the vehicle input shaft taken through line 6-6 in FIG. 2.

As shown in FIG. 6, the spline grooves 46 of the spline portion 44 do not exit directly onto the shaft body 32. Instead, the blend out fillets 48 interrupt the spline grooves 46 by providing additional material near the shaft body 32. The removal of this exit greatly reduces and/or eliminates critical stress points of traditional input shafts resulting in longer life of the input shaft 30.

As shown in FIG. 2, each blend out fillet 48 may have a radius of curvature $R_F$. In an embodiment of the present invention, the blend out fillets may comprise a curved shape, e.g., a concave shape having a radius of curvature $R_F$. For example, the blend out fillets 48 may have radius of curvature ranging from 0.25 to 1.5 inches, for example, from 0.5 to 1.25 inches or from 0.75 to 1.15 inches. In the embodiment shown, each blend out fillet comprises a substantially cylindrical concave shape. However, any other suitable shape of the blend out fillet 48 may be used, for example, a flat ramp, a convex curved ramp, a complex curved ramp with concave and convex portions, a concave spherical shape, and the like. As a result of the blend out fillets 48, the spline grooves do not extend at their lowermost radial depths onto the shaft body 32 and stress points are eliminated. Furthermore, the blend out fillets 48 provide additional material at the second end of the spline portion 44 between the spline teeth 45 to reinforce an area of the input shaft 30 that is subjected to increased forces during operation.

As shown in FIG. 2, the input shaft 30 also comprises a tapered transition 50 between the second end of the spline portion 44 and the shaft body 32. The tapered transition 50 extends a radial extension distance from the shaft body 32 and also extends an axial length from the shaft body 32 toward the second end of the spline portion 44 to an intersection located at the radial outermost edge 49 of the blend out fillets 48 and the radial outmost surfaces of the spline teeth 45. For example, the axial length of the tapered transition 50 may range from 0.1 to 0.75 inch, for example, from 0.15 to 0.5 inch or from 0.25 to 0.4 inch. The tapered transition 50 extends radially from the shaft body 32 to a radial outermost ring 51, which in the embodiment shown corresponds to the radial outer surfaces of the spline teeth 45. For example, the radial extension distance of the tapered transition 50 may range from 0.1 to 0.75 inch, for example, from 0.15 to 0.5 inch or from 0.2 to 0.35 inch. The ratio of the axial length to the radial extension distance of the tapered transition 50 may typically range from 5:1 to 1:5, for example, from 3:1 to 1:3, or from 1.5:1 to 1:1.5. In a particular embodiment, the ratio of the axial length to the radial extension distance of the tapered transition 50 may be about 1:1. The radial outermost ring 51 of the tapered transition may typically extend at least 50 percent of the radial distance between the shaft body 32 and the radial outer surface of the spline teeth 45, or at least 75 percent of the radial distance between the shaft body 32 and the radial outer surface of the spline teeth 45. In the embodiment shown in FIG. 2, the radial outermost ring 51 of the tapered transition extends substantially the same radial distance from the shaft body as the radial outer surfaces of the spline teeth 45.

As shown in FIG. 2, the tapered transition may comprise a curved longitudinal section comprising a radius of curvature $R_S$. The radius of curvature $R_S$ of the curved surface of the tapered transition 50 is measured from a longitudinal section as shown in FIG. 2. For example, the radius of curvature $R_S$ of a longitudinal section of the tapered transition 50 may range from 0.1 to 2 inches, for example, from 0.25 to 1 inch or from 0.35 to 0.75 inch. However, any other suitable shape of tapered transition 50 may be used, for example, a conical shape with a flat ramp longitudinal section, a convex curved ramp or a complex curved ramp with concave and convex portions. The tapered transition 50 provides additional material at the second end of the spline portion 44 where elevated levels of stress occur.

In the embodiment shown, at the intersection between the radial outermost ring 51 and the radial outermost edge 49 a slight radius of curvature may be provided. For example, the radius of curvature at the intersection between the radial outermost ring 51 and the radial outermost edge 49 may range from 0.001 to 0.1 inch, for example, from 0.005 to 0.05 inch or from 0.0075 to 0.025. The radius of curvature at the intersection reduces a potential stress point between the radial outermost ring 51 and the radial outermost edge 49.

In accordance with certain embodiments, the bearing boss 42 includes a first boss end at the first shaft end 40 and a second boss end adjacent to the spline portion 44. As shown in FIG. 2, the bearing boss 42 may be a crowned bearing boss having an increased diameter at a central point along its axial length and decreased diameters at the first and second boss ends. The crown of the bearing boss 42 may have a generally spherical surface defining a radius of curvature $R_B$. The radius of curvature $R_B$ of the generally spherical surface of the bearing boss 42 is measured from a central point along its axial length as shown in FIG. 2. For example, the radius of curvature $R_B$ of the bearing boss may range from 1 to 6 inches, for example, from 2 to 5 inches or from 3 to 4 inches. The crowned bearing boss 42 may engage the pilot bearing 8 of the flywheel 6. The crowned bearing boss 42 allows the input shaft 42 to move freely inside the pilot bearing 6 when it flexes from the extreme side load it experiences during operation. During operation, the second end 34 of the input shaft 30 may be twisted off-center from the longitudinal axis of the input shaft 30. Thus, allowing the bearing boss 42 to move freely results in the input shaft 30 having an improved wear life when compared to conventional shafts having a square bearing boss that does not allow movement within the pilot bearing. Although the pilot bearing shown in FIG. 1 is located in the flywheel, the pilot bearing may be located in any other suitable location, e.g., the crankshaft of the engine.

In accordance with an embodiment of the present invention, the overall input shaft length from the first shaft end 40 to the second shaft end 34 may be selected based upon the particular clutch assembly 5 used. For example, the overall input shaft length from the first shaft end 40 to the second end 34 may range from 10 to 24 inches, or from 12 to 20 inches, or from 14 to 18 inches. As shown in FIG. 6, the spline portion 44 has a length L selected to allow a desired number of clutch discs 20 to be positioned on the spline portion 44. For example, the spline portion 44 length L may range from 1 to 8 inches, or from 2 to 6 inches, or from 3 to 5 inches. The shaft body 32 may have a length from the tapered transition 50 to the second shaft end 34 that may range from 4 to 18 inches, or from 6 to 16 inches, or from 8 to 14 inches. The shaft body 32 length is greater than the spline portion 44 length L, e.g. at least 150 percent greater. For example, the ratio of the shaft body 32 length to the spline portion 44 length L may be from 10:1 to 1:3, or from 5:1 to 1:2, or from 3:1 to 1:1, or about 2.5 to 1.

Figure 7:
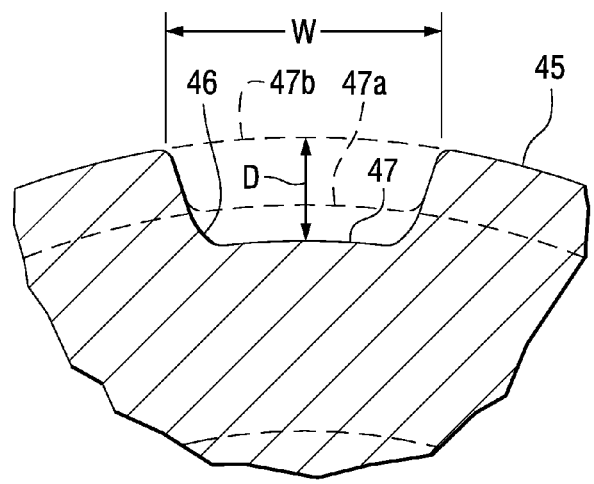
FIG. 7 is an expanded cross-sectional view of a portion of the spline portion of the vehicle input shaft in accordance with an embodiment of the present invention.

As shown in FIG. 7, the spline grooves 46 have a width W measured at the outer circumference of the spline teeth 45 and a radial depth D measured from the bottom surface 47 to the outer circumference of the spline teeth 45. For example, the spline groove 46 width W may range from 0.1 to 0.75 inch, or from 0.2 to 0.5 inch, or from 0.25 to 0.35 inch. In a particular embodiment, the spline groove 46 width W may be 0.3 inch. For example, the spline groove 46 depth D may range from 0.025 to 0.5 inch, or from 0.05 to 0.3 inch, or from 0.075 to 0.25 inch. Any other suitable width W and radial depth D of the spline grooves may be used to engage the central splined opening of conventional clutch discs.

The input shaft of the present invention may be made of any suitable material, such as steel, aluminum, titanium or any other material having sufficient strength. The input shaft of the present invention may be fabricated by any suitable technique, such as machining to provide the bearing boss, spline portion, blend out fillets, tapered transition and drive line teeth.

In an embodiment of the present invention, the input shaft may be subjected to one or more conventionally known surface finish processes, including shot peening and/or super finishing. The input shaft may be shot peened by impacting the surface with shot, e.g., round metallic, glass, ceramic particles or the like, with force sufficient to create plastic deformation. The shot peening process may produce a compressive residual stress layer and improves mechanical properties of the input shaft of the present invention. In addition, the input shaft may be super finished by using a fine grit solid abrasive after the shaft is machined and/or ground to an initial finish. The surface finishing process(es) may provide improved wear resistance, durability and increased operational life of the input shafts.

Whereas particular embodiments of this invention have been described above for purposes of illustration, it will be evident to those skilled in the art that numerous variations of the details of the present invention may be made without departing from the invention as defined in the appended claims.

What is claimed is:

1. An input shaft for a vehicle drive line comprising: a first shaft end; a bearing boss at the first shaft end comprising a generally spherical surface having an increased diameter at a central point along its axial length and decreased diameters at a first bearing boss end at the first shaft end and a second bearing boss end adjacent the first spline end of the spline portion; a spline portion having a first spline end adjacent to the first shaft end and a second spline end, the spline portion comprising multiple spline teeth extending in a direction parallel with a longitudinal axis of the input shaft and extending radially away from the longitudinal axis, and multiple radially indented spline grooves located circumferentially between adjacent ones of the spline teeth extending in a direction parallel with the longitudinal axis of the input shaft; a second shaft end; a substantially cylindrical shaft body extending from the second shaft end toward the second spline end; and a tapered transition between the second spline end and the shaft body, wherein each spline groove comprises a blend out fillet adjacent the second spline end extending radially outward from a bottom surface of the spline groove toward the shaft body; wherein the input shaft is a one piece shaft.

2. The input shaft of claim 1, wherein each blend out fillet forms part of a radial outermost ring.

3. The input shaft of claim 2, wherein the radial outermost ring formed by the blend out fillets has a diameter that is substantially equal to an outer diameter formed by radial outermost surfaces of the spline teeth.

4. The input shaft of claim 1, wherein a radial outermost edge of each blend out fillet extends at least 50 percent of a radial distance between the bottom surface of the spline groove and radial outer surfaces of the adjacent spline teeth.

5. The input shaft of claim 4, wherein the radial outermost edge of each blend out fillet extends at least 75 percent of a radial distance between the bottom surface of the spline groove and a radial outer surface of the spline teeth.

6. The input shaft of claim 1, wherein each blend out fillet comprises a concave surface.

7. The input shaft of claim 1, wherein the blend out fillet comprises a curved surface.

8. The input shaft of claim 7, wherein the curved surface of the blend out fillet has a radius of curvature $R_F$ of from 0.25 to 1.5 inches.

9. The input shaft of claim 1, wherein the blend out fillet comprises an axial length of from 0.05 to 0.75 inch, and a radial extension distance measured from the bottom surface of the spline groove of from 0.1 to 0.5 inch.

10. The input shaft of claim 9, wherein the ratio of the axial length to radial extension distance of the blend out fillet is from 3:1 to 1:2.

11. The input shaft of claim 1, wherein the tapered transition comprises a concave surface.

12. The input shaft of claim 1, wherein the tapered transition comprises a curved surface.

13. The input shaft of claim 12, wherein the curved surface of the tapered transition has a radius of curvature $R_s$ of from 0.25 to 1 inch.

14. The input shaft of claim 1, wherein the tapered transition comprises an axial length of from 0.1 to 0.75 inch, and a radial extension distance of from 0.1 to 0.75 inch.

15. The input shaft of claim 14, wherein the ratio of the axial length to radial extension distance of the tapered transition is from 3:1 to 1:3.

16. The input shaft of claim 1, wherein the generally spherical surface of the bearing boss has a radius of curvature $R_B$ of from 2 to 5 inches.

17. A clutch assembly comprising:
a clutch plate cover structured and arranged for attachment to a flywheel of a vehicle engine;
at least one clutch disc inside the clutch plate cover;
an input shaft upon which the at least one clutch disc is mounted for rotation with the input shaft and sliding engagement along a longitudinal axis of the input shaft, wherein the input shaft comprises:
a first shaft end;
a bearing boss at the first shaft end of the input shaft engageable within a pilot bearing of the flywheel, wherein the bearing boss comprises a generally spherical surface having an increased diameter at a central point along its axial length and decreased diameters at a first bearing boss end at the first shaft end and a second bearing boss end adjacent the first spline end of the spline portion;
a spline portion having a first spline end adjacent to the first shaft end and a second spline end, the spline portion comprising multiple spline teeth extending in a direction parallel with a longitudinal axis of the input shaft and extending radially away from the longitudinal axis, and multiple radially indented spline grooves located circumferentially between adjacent ones of the spline teeth extending in a direction parallel with the longitudinal axis of the input shaft;
a second shaft end;
a substantially cylindrical shaft body extending from the second shaft end toward the second spline end; and
a tapered transition between the second spline end and the shaft body.

18. An input shaft for a vehicle drive line comprising: a first shaft end; a bearing boss at the first shaft end comprising a generally spherical surface having an increased diameter at a central point along its axial length, a decreased diameter at a first bearing boss end located at the first shaft end, and decreased diameter at a second bearing boss end; a spline portion having a first spline end adjacent to the second bearing boss end and a second spline end, the spline portion comprising multiple spline teeth extending in a direction parallel with a longitudinal axis of the input shaft and extending radially away from the longitudinal axis, and multiple radially indented spline grooves located circumferentially between adjacent ones of the spline teeth extending in a direction parallel with the longitudinal axis of the input shaft; a second shaft end; a substantially cylindrical shaft body extending from the second shaft end toward the second spline end; and a tapered transition between the second spline end and the shaft body; wherein the input shaft is a one piece shaft.

19. The clutch assembly of claim 17, wherein each spline groove comprises a blend out fillet adjacent the second spline end extending radially outward from a bottom surface of the spline groove toward the shaft body.

20. The input shaft of claim 18, wherein the generally spherical surface of the bearing boss has a radius of curvature $R_B$ of from 2 to 5 inches.

* * * * *